(No Model.)

W. DICER.
PLOW SHARE AND POINT.

No. 261,836.                                Patented Aug. 1, 1882.

WITNESSES
Fred. G. Dieterich
P. C. Dieterich

INVENTOR
Wm Dicer
per
DeWitt C. Allen Attorney

UNITED STATES PATENT OFFICE.

WILLIAM DICER, OF MARENGO, ASSIGNOR OF ONE-HALF TO PRATT A. SPICER, OF MARSHALL, MICHIGAN.

PLOW SHARE AND POINT.

SPECIFICATION forming part of Letters Patent No. 261,836, dated August 1, 1882.

Application filed December 23, 1881. (No model.)

*To all whom it may concern:*

Be it known that I, WILLIAM DICER, a citizen of the United States, residing at Marengo, in the county of Calhoun and State of Michigan, have invented certain new and useful Improvements in Plow Shares and Points; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

The object of my invention is the production of a plow share and point that can be used to advantage in all kinds of soil and under all its different conditions; and to this end the invention consists in novel features of construction and combination and arrangement of parts, all as will be hereinafter fully described, and specifically designated in the claims.

Figure 1:
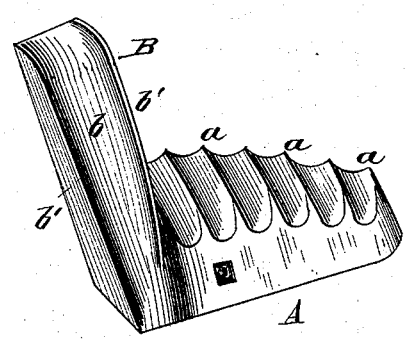
Figure 2:
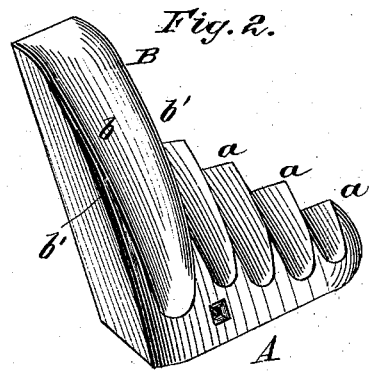
Figure 3:
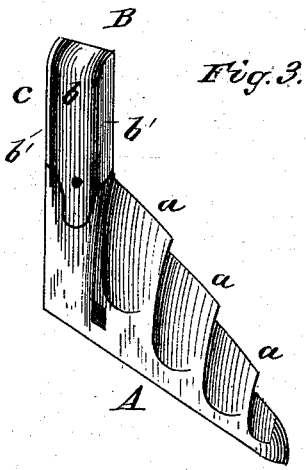
Figure 4:
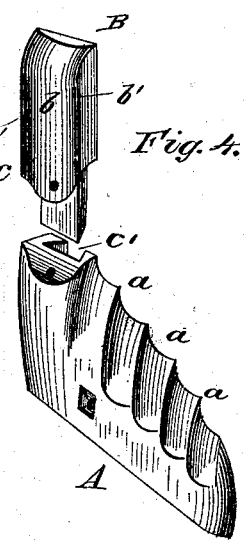
Figure 5:
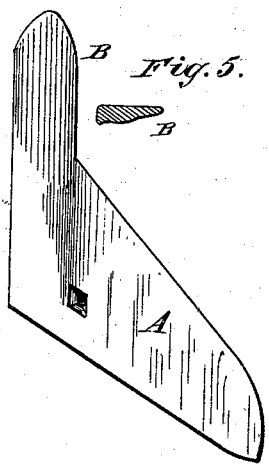
Figure 6:
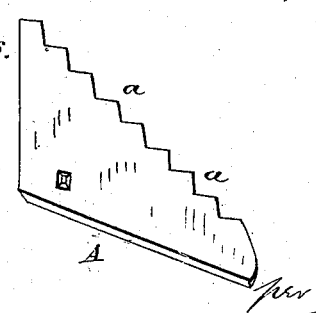

Referring to the accompanying drawings, Figures 1 and 2 are views in perspective of my improved plowshare; Figs. 3 and 4, views in perspective of my improved plow share and point, showing different ways of connecting the point to the share; Fig. 5, a view in perspective of the common share and point, showing the manner in which the point is worn away; Fig. 6, modifications to be hereinafter referred to.

In the drawings, A represents the plow-share or wing, and B the plow-point. This plow-point has a concave groove or is hollowed out on its upper side through its longitudinal center, as shown at $b$, and the extra metal put in the sides, which raises them up, forming side flanges, $b'$ $b'$, that greatly strengthen the point. The hollow in the center of the point is gradually turned outward toward each side and brought up to a sharp edge, and also brought down gradually to the point coming near the end or the concave groove of variable curvature or width in its cross-section to have it enter the ground easily, all as clearly shown in Figs. 1, 2, 3, and 4. The above-described construction of point prevents the sides from wearing so fast, or only as fast as the center, on account of the greatest friction and wear coming on the sides, which being made thicker and heavier, and gradually decreasing in thickness toward the longitudinal center, as well as the forward end of the point, it will wear even and keep and square sharp until worn out, when it can be replaced with a new point.

In Figs. 1 and 2 I have shown the point and share cast or formed integral with each other; but the point may have a nose-piece, $c$, attached by fitting into a slot or groove, $c'$, in share proper, as shown in Fig. 3, or made to slip in and on the end of an ordinary point, as shown in Fig. 4, or in various other ways common in plow-points having detachable nose-pieces. When desired the point may be wider at its outer end, as shown in Fig. 4. The share or wing has its cutting-edge corrugated, as shown in Figs. 1 and 2, the ridges $a$, formed by the corrugations on the face and corners, being made rounding, as shown in Fig. 1, or square, or nearly so, as shown in Fig. 2. Instead of having a long point or nose-piece, the share may be formed as shown in Fig. 6, the point being a continuation of the share, and may have its corrugations as shown in Figs. 1 and 2, or modifications of same. These forms adapt them to all kinds and conditions of soil.

The object in having the edge of the share or wing corrugated is to allow it to work among stones readily, (in very strong ground, or where there are a great many small or cobble-stones,) the uneven edge working them out of the way and aiding in keeping the plow in the ground, and for various other purposes, not the least of which is, the upper part of the wing or share being hollowed out similar to the point, the edge does not become dull but wears sharp. The shares and points may be made of steel, chilled iron, or other suitable material, as may be deemed expedient.

In Fig. 5 I have shown an ordinary point as worn. The sides being worn off and the metal being thick in the center, it does not wear off as fast as the sides, but forms a blunt point, and, being thick, is worn off or beveled upward from the bottom side, which prevents its entry or staying in the ground when it is dry and hard. In my improved point it is so thin in the center that it cannot form the upward bevel on the under side only in slight degree. Hence it keeps sharp, and must therefore stay in the ground. In the old-style points the nose-piece or end of point, on account of wear on its under side, has to be made pitching downward to aid it in staying in the ground, which makes the plow draw harder, as the draft is downward, and, as the cutting principle is not correctly applied, it makes the common point wear out much faster than my improved point, and also wear off in bad shape. While my improved plow share and point can be used to advantage in all kinds of soil, as before mentioned, it has other advantages, which are as follows: Its construction is such as to make it much stronger and more durable, and thus outlast any of the shares and points now in general use, and, instead of wearing dull, they wear sharp, while requiring or taking less draft, and will run steadier and not be thrown out of the ground.

The principle upon which the cutting-edge of share and point is made is valuable on a prairie-breaking plow to cut off easily the leathery roots of weeds and grasses, also in other soils, as before described.

I am aware that a plow-point having its upper surface provided with a concave groove and its lower surface substantially flat, said groove being of variable curvature or width in its cross-section, is old, and such I do not wish to be understood as claiming broadly as of my invention.

Having thus fully described my invention, what I claim as new, and desire to secure by Letters Patent, is—

1. A plowshare having a corrugated cutting-edge, and its upper surface having a series of parallel concave grooves of variable curvature or width in their cross-section, and the lower surface of said share substantially flat, as and for the purpose specified.

2. The combination, with a plow-point, having its upper surface provided with a concave groove and its lower surface substantially flat, said groove being of variable curvature or width in its cross-section, of a plowshare having a series of similar parallel concave grooves, substantially in the manner as and for the purpose specified.

In testimony whereof I affix my signature in presence of two witnesses.

WILLIAM DICER.

Witnesses:
JAMES A. MINER,
WILLIAM J. McGEE.